Figure 1:
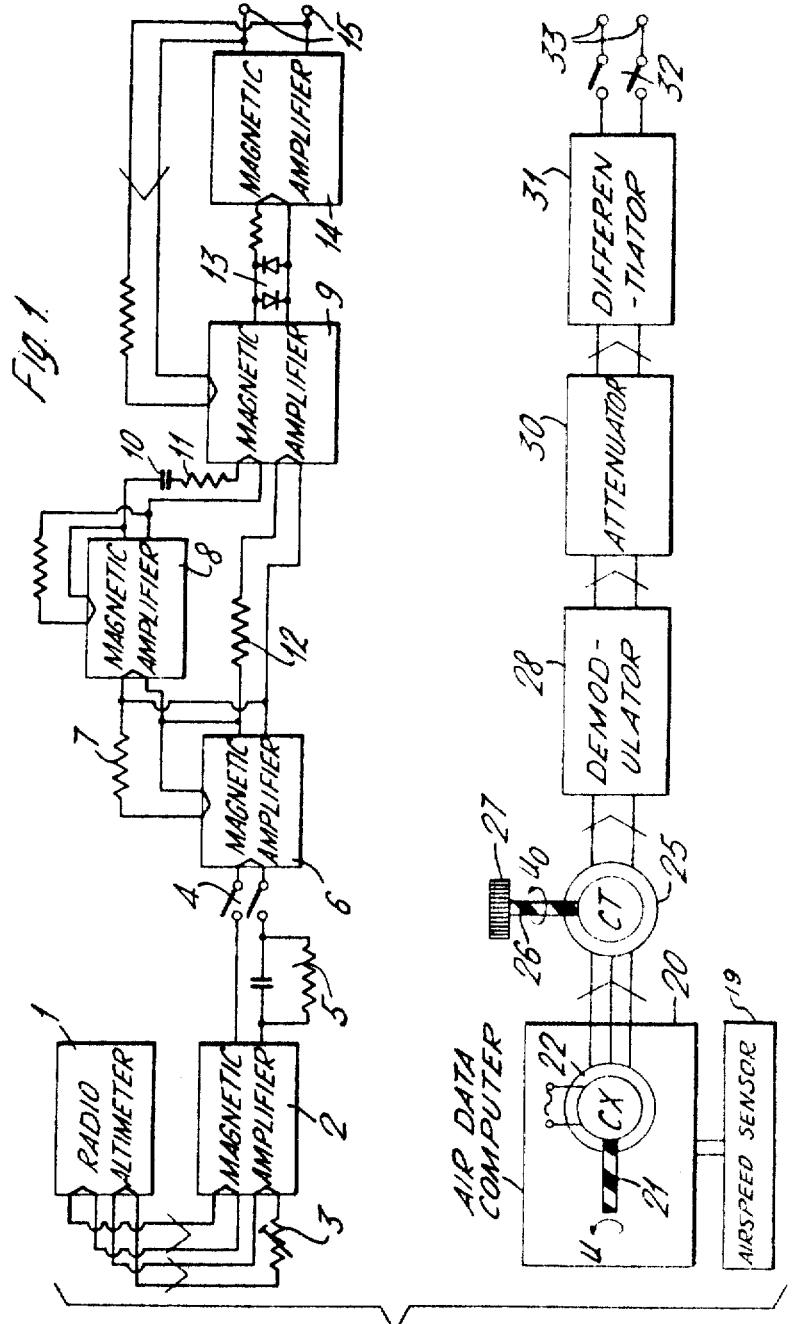

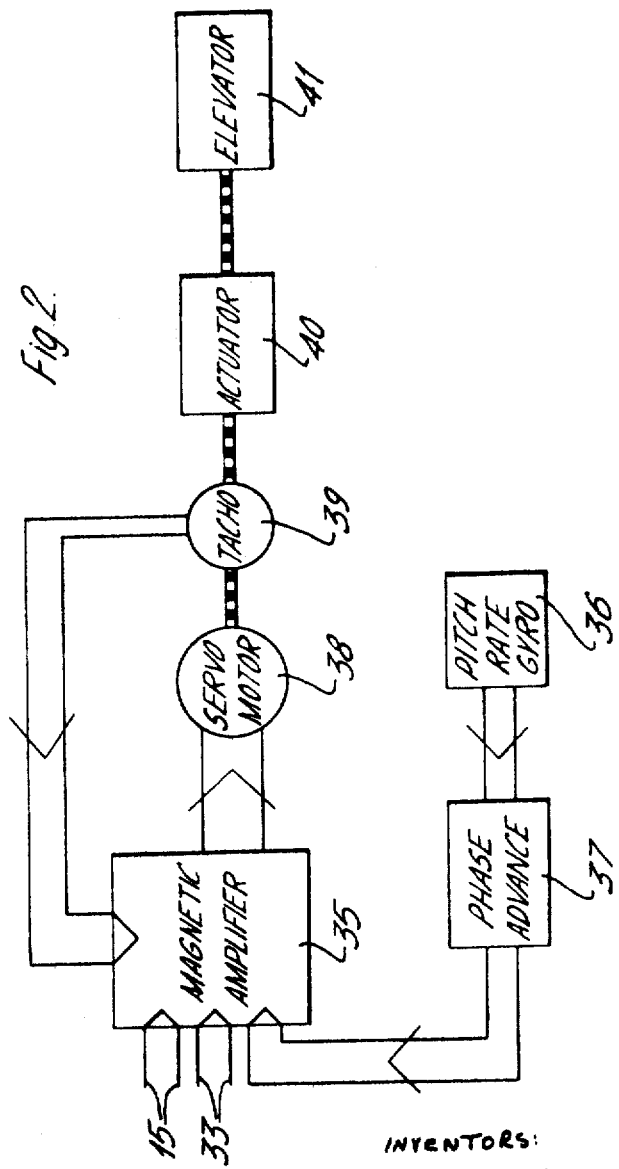

United States Patent Office 3,269,675
Patented August 30, 1966

3,269,675
AUTOMATIC FLIGHT CONTROL SYSTEMS
FOR AIRCRAFT
Heinz Pollak, Cheltenham, and John Lionel Weston, Churchdown, England, assignors to S. Smith & Sons (England) Limited, Cricklewood, London, England, a British company
Filed Jan. 16, 1964, Ser. No. 338,152
Claims priority, application Great Britain, Jan. 18, 1963, 2,216/63
8 Claims. (Cl. 244—77)

This invention relates to automatic flight control systems for aircraft, and is concerned in particular with automatic flight control systems for use in controlling pitch attitude of aircraft.

Automatic flight control systems for controlling pitch attitude of aircraft are known embodying, in the case of a conventional aircraft, a control channel for so positioning the one or more elevators of the aircraft as to tend to maintain the flight path of the aircraft as far as pitch is concerned in conformity with a predetermined control law. The control is effected in response to a demand for manoeuvre of the aircraft in pitch, which demand is derived in the system in accordance with the relevant control law and may be in terms of a demanded change or rate of change of pitch attitude. The control law used may, for example, be one appropriate to maintaining the aircraft at a selected height, or to causing the aircraft to attain a selected height at a predetermined rate of ascent or descent. Additionally, the control law may be one appropriate to one or more phases of a manoeuvre such as that of landing the aircraft. Facilities may be provided for changing the control law in accordance with a manual selection of a desired mode of operation of the system, or alternatively in response to the existence of a predetermined condition such as, for example, the condition in which the aircraft has descended to the predetermined height required for change from one phase to another of a landing manoeuvre.

In certain circumstances, especially for example during a landing manoeuvre of an aircraft, it is necessary that the flight control system shall act to confine transient vertical excursions of the aircraft from the desired flight path to within narrow limits. Such strict limitation of vertical excursions is generally not required where the aircraft is in cruising flight at high altitude, the vertical excursions in this case (for example due to turbulence, and perhaps involving excursions of as much as one hundred feet) being allowed to be corrected by the system on a long term basis. At low altitudes however, such as for example when a landing manoeuvre is being made, or in the case of military or naval aircraft carrying out extended low-level flight, large transient vertical excursions are not normally permissible. It is an object of the present invention to provide an automatic flight control system that may be used in these latter circumstances.

According to one aspect of the present invention, in an automatic flight control system for an aircraft, means is arranged to provide a signal that varies in accordance with variation in airspeed of the aircraft. A control channel for controlling the aircraft in pitch is responsive to said signal and tends to effect change in pitch attitude of the aircraft in response to change in said airspeed, the sense of said change in pitch attitude being such as to tend to compensate for change in lift consequence upon the change in airspeed by change in incidence of the aircraft.

The effect of making a change in pitch in the manner defined in the preceding paragraph may be de-stabilising in the long term, particularly if the aircraft is operating in the region of its minimum drag speed. However this situation has been found to be acceptable where, on the one hand, the system is operating in a mode that does not involve a prolonged manoeuvre of the aircraft (for example, during the flare out of a landing manoeuvre), or, on the other hand, where the airspeed is in the longer term maintained by automatic or manual throttle-control.

The flight control system may include means arranged to provide a signal dependent upon height of the aircraft, and the control channel may be responsive to this latter signal to tend to maintain the flight path of the aircraft, as far as pitch is concerned, in conformity with a predetermined control law dependent upon said height. In these circumstances, and where the system is for use during a landing manoeuvre, the control law may be such as to define a substantially exponential flare out of the flight path.

According to another aspect of the present invention, in an automatic flight control system for an aircraft, a demand for manoeuvre of the aircraft in pitch is arranged to include a component which, in accordance with change in airspeed of the aircraft, tends to call for change in pitch in such a sense as to tend to compensate for change in lift consequent upon the change in airspeed by change in incidence of the aircraft.

This flight control system may include means responsive to said demand for actuating one or more control surfaces of the aircraft, the one or more control surfaces being surfaces for manoeuvring the aircraft in pitch and being actuated as aforesaid in accordance with said demand. The control surfaces in the case of conventional aircraft may be elevators, or, for example in the case of certain delta wing aircraft, may be elevons, i.e., control surfaces for manoeuvering the aircraft in roll as well as pitch.

According to a feature of the present invention, an automatic flight control system for an aircraft comprises first means for providing a first signal that varies according to variation of height of the aircraft, second means for providing a second signal that varies according to variation of airspeed of the aircraft, means responsive to said first and second signals for providing a demand for manoeuvre of the aircraft in pitch, which demand has a first component that is dependent upon a predetermined function of said height, and a second component that is dependent upon a predetermined function of said airspeed in such a sense as to tend to compensate for change in airspeed by change in the opposite sense of pitch attitude.

The term "function" as used in the present specification is used broadly to include functions involving derivatives and integrals with respect to time of the relevant variables, and in this connection also the function of airspeed referred to in the preceding paragraph may for example involve, apart from any constants, only for differential with respect to time of the airspeed.

The invention is readily applicable to automatic flight control systems for use during an ILS (Instrument Landing System) landing manoeuvre. In this connection a conventional ILS landing manoeuvere comprises five phases: a first, the track phase, in which the aircraft flies at a substantially constant height and obtains guidance in azimuth from the localiser radio beam of an ILS system; a second, the glide phase, in which the aircraft continues to be guided in azimuth by the localiser beam and obtains guidance in pitch from the glidepath radio beam of the ILS system, the glidepath and localiser beams together defining an approach path which descends (for example, at some three degrees to the horizontal) towards the runway where the landing is to be made; a third, the attitude phase, which commences at a height from which the glidepath beam is no longer usable, for example, because of noise, and in which the aircraft flies along an extension of the glidepath; a fourth, the flare phase, in which the aircraft from a height, for example, of fifty feet commences the flare out; and the fifth, the land phase, in which the flare out is completed, and, from a height of some ten to twenty feet, the aircraft is brought to the condition in which it is heading along the runway with wings level ready for touchdown. Throughout the attitude and flare phases guidance in azimuth may still be obtained from the localiser beam, or resort may be made to use of a leader-cable system.

The present invention may be utilised as desired throughout any or all of the phases of an ILS landing manoeuvre, but it is especially applicable to the flare and land phases. The flare out of an ILS landing manoeuvre is normally substantially exponential, being defined in terms of the height $h$ of the aircraft with respect to a datum level (normally a few feet below ground level) by an equation of the basic form $$Dh + h/\tau = 0$$

where $D$ is the differential operator representative of differentiation with respect to time, and $\tau$ is a time constant having a value for example between four and eight seconds.

An automatic flight control system in accordance with the present invention, and operative to control an aircraft in pitch during the flare and land phases of an ILS landing manoeuvre, will now be described by way of example, with reference to the accompanying drawings in which:

FIGURE 1 shows, in schematic form, electrical circuits of the system adapted to generate two component signals of a pitch rate demand; and FIGURE 2 shows, in schematic form a servo arrangement of the system adapted to control elevators of the aircraft in accordance with the pitch rate demand.

The system shown in the drawings forms part of an automatic pilot which can be engaged in a mode to control the aircraft to perform a complete ILS landing manoeuvre, as well as in a mode to control it in cruising flight. The automatic pilot, which has three channels that are arranged to control respectively elevators, ailerons, and rudder of the aircraft, is basically a "rate-rate" system in that each channel derives a demand for rate of movement of the relevant control surface of the aircraft.

The present invention is concerned particularly with the control of an aircraft in pitch, and in this respect the following description is confined to the channel of the automatic pilot which controls the elevators of the aircraft. The general arrangement of this channel may be, for example, similar to that described in U.S. Patent No. 3,190,586, issued to D. W. Righton, on June 22, 1965, in which three indentical sub-channels are connected in parallel to control the elevators of the aircraft, the particular control law which applies being dependent upon the setting of a mode selector. The system represented in the drawings accompanying the present specification has the circuit configuration which (apart from the settings of two switches) obtains in each sub-channel of the elevator channel when the mode selector has been set to the position appropriate to the selection of an ILS landing manoeuvre and the first three phases, that is to say the track, glide and attitude phases, have been completed. This configuration is that which obtains throughout the flare and land phases, and is achieved as a result of the execution of a switching sequence within the elevator channel, the successive steps of the sequence being initiated, in a manner such as that described in the aforesaid U.S. Patent No. 3,190,586, as the aircraft descends to predetermined heights.

Referring to FIGURE 1, a radio altimeter 1, for example a frequency modulated radio altimeter, supplies two output direct current signals to two control windings respectively of a magnetic amplifier 2. A first of the two signals is representative of the height, $h_a$, of the aircraft above ground and is supplied directly to the respective control winding, whereas the second signal is in the nature of a reference signal and is supplied to its respective control winding via a pre-set resistor 3. The reference signal applied to the magnetic amplifier 2 via the resistor 3 is representative (according to the same relationship as exists between the first signal and the height $h_a$) of a height $h_d$ which defines, with respect to ground, the datum level towards which the exponential flare path is desired to be asymptotic. The datum height $h_d$ is normally chosen to be a few feet below ground level in order to achieve a positive touch down, the actual value represented by the signal applied to the magnetic amplifier 2 being dependent in magnitude upon the setting of the resistor 3 and in sense upon the sense with which the signal is applied to the magnetic amplifier 2.

The magnetic amplifier 2 (like other magnetic amplifiers referred to below) is of conventional form and is provided with appropriate rectifying and smoothing circuits (not shown) so as to supply a direct current output signal. The output signal in this instance is representative of the height difference $(h_a - h_d)$, that is to say, of the height $h$, of the aircraft with respect to the datum level. When, as in the present circumstances, switch contacts 4 are closed, this output signal is passed via a resistance-capacitance network 5 to a control winding of a further magnetic amplifier 6. As a result of the provision of the network 5, the signal supplied to the magnetic amplifier 6 is representative of the exponential function:

$$[(D+1/\tau_5)/(1+\tau_6 D)]h$$

the values of the time constants $\tau_5$ and $\tau_6$ being dependent upon the resistance and capacitance values of the network 5 and also upon the values of the input and output impedances of the respective magnetic amplifiers 6 and 2.

The output signal of the magnetic amplifier 6 is supplied via a resistor 7 to another control winding of the magnetic amplifier 6 as degenerative feedback, and is also supplied to first control windings of magnetic amplifiers 8 and 9 respectively. The magnetic amplifier 8 has, in addition to its said first control winding, a further control winding to which its output signal is supplied as degenerative feedback. The output signal of the magnetic amplifier 8 is also supplied via a series-connected capacitor 10 and resistor 11 to a second control winding of the magnetic amplifier 9. The transfer function of the network formed by the capacitor 10, the resistor 11 and the second control winding of the magnetic amplifier 9 is directly proportional to:

$$D/(1+\tau_3 D)$$

the time constant $\tau_3$ having a value dependent upon the values of the capacitor 10, the resistor 11 and the input impedance of the second control winding of the magnetic amplifier 9.

The magnetic amplifier 9 acts to sum the signals applied to its first and second control windings, with the result that the output signal from the amplifier 9 is representative of the function:

$$[1/\tau_4 + D/(1+\tau_3 D)][D+1/\tau_5)/(1+\tau_6 D)]h$$

the time constant $\tau_4$ having a value which is dependent upon the value of a resistor 12 via which the output signal of the magnetic amplifier 6 is applied to the first control winding of the magnetic amplifier 9. The output signal of the magnetic amplifier 9 is supplied via a diode limiter-network 13 to a further magnetic amplifier 14 the output signal of which is supplied to a pair of terminals 15. The signal supplied to the pair of terminals 15, which signal is representative of the last-quoted function within limits defined by the network 13, is also supplied as degenerative feedback to a third control winding of the magnetic amplifier 9.

An air data computer 20 provides a signal representative of indicated airspeed $u$ of the aircraft. The air data computer 20, which is part of the normal equipment of the aircraft, is coupled to a conventional pitot-and-static pressure sensing head or airspeed sensor 19 on the aircraft, and computes the indicated airspeed $u$ as a function of the difference, $(P-S)$, between a measure of the pitot pressure P and the static pressure S. The computer 20 is an electromechanical unit, and the computed value of indicated airspeed $u$ is represented therein by the angular position of a shaft 21. The rotor of a synchro control transmitter 22 is coupled to the shaft 21 within the computer 20, the rotor winding being energised with alternating current so that a three-phase signal modulated in accordance with the indicated airspeed $u$ is supplied from the stator windings of the transmitter 22.

The three-phase signal representative of $u$ provided by the synchro control transmitter 22 of the air data computer 20, is supplied to the three-phase stator windings of a synchro control transformer 25. The rotor of the transformer 25 is positioned with respect to the stator in accordance with the rotational position of a shaft 26 which is set by means of a manual control 27 in accordance with a datum value $u_0$ of indicated airspeed. The control 27 is that which is used to select the desired indicated airspeed of the aircraft for another mode of operation of the autopilot, and its setting is not relevant to the mode under present consideration except insofar as it is preferable that no change in the setting be made during this mode.

An alternating current signal modulated in accordance with the difference $(u-u_0)$ between the computed and datum values $u$ and $u_0$ of indicated airspeed is induced in the rotor winding of the transformer 25 and is supplied to a demodulator 28 for demodulation. The output signal of the demodulator 28, being a direct current signal representative of the difference $(u-u_0)$, is supplied through an adjustable attenuator 30 to derive a signal dependent upon $k(u-u_0)$, $k$ being a constant having a value dependent upon the setting of the attenuator 30. The attenuator 30 includes a filter network for reducing noise effects and having a transfer function:

$$1/(1+\tau_2 D)$$

where $\tau_2$ is a time constant, the signal derived from the attenuator 30 being supplied to a differentiator 31 to derive a signal representative of the function:

$$[kD/(1+\tau_2 D)][u-u_0]$$

This signal is supplied via switch contacts 32, which contacts are closed in the present mode, to a pair of output terminals 33, and, like the signal supplied to the pair of terminals 15, provides a component of a pitch rate demand $(D\theta)_d$ applied to an elevator servo arrangement of the system. The elevator servo arrangement is shown in FIGURE 2 and will now be described.

Referring to FIGURE 2, the signals appearing at the pairs of terminals 15 and 33 are supplied to first and second control windings respectively of a magnetic amplifier 35. The magnetic amplifier 35, which effectively sums these two signals to provide the pitch rate demand $(D\theta)_d$, has a third control winding that receives a signal which is dependent upon the actual pitch rate $D\theta$ and which is derived from a rate gyro 36 responsive to movement of the aircraft in pitch. The pitch rate gyro 36 provides a signal representative of the pitch rate $D\theta$, and this signal is passed to the third control winding of the magnetic amplifier 35 via a phase advance network 37 which has a transfer function:

$$(1+N\tau_7 D)/(1+\tau_7 D)$$

N and $\tau_7$ being numerical and time constants respectively.

The output signal of the magnetic amplifier 35, which signal is dependent upon the difference between the actual and demanded pitch rates, is supplied to an electric servo motor 38. The motor 38 is coupled, on the one hand, to drive an electric tachometer generator 39, and is coupled, on the other hand, to drive an actuator 40 which, in turn, drives elevator control surfaces 41 of the aircraft. The tachometer generator 39 derives an electric signal which is dependent upon the rate at which the actuator 40 is driven by the motor 38, and this signal is supplied as degenerative feedback to a fourth control winding of the magnetic amplifier 35. The control signal supplied to the servo motor 38 from the magnetic amplifier 35 is, as a result, such as to cause the elevator control surfaces 41 to be driven, by the motor 38 through the actuator 40, in accordance with:

$$D\eta = G\{[(1+N\tau_7 D)/(1+\tau_7 D)]D\theta - (D\theta)_d\}$$

$D\eta$ being the rate of change of angular position, $\eta$, of the elevator control surfaces 41, and G being a numerical constant.

The pitch rate demand $(D\theta)_d$ effective in the magnetic amplifier 35 is, as indicated above, the sum of the two signals supplied to the pair of terminals 15 and 33, and is in fact given by the control law:

$$(D\theta)_d = -[1/\tau_4 + D/(1+\tau_3 D)][(D+1/\tau_5)/(1+\tau_6 D)]h - [kD/(1+\tau_2 D)][u-u_0]$$

Thus the demand has a first component that is representative of a function of height $h$, and a second component representative of a function of airspeed $u$. The factor $(D+1/\tau_5)$ which is effective on the variable $h$ in the first component acts to define the basic exponential flare path of the ILS landing manoeuvre. The second component is dependent only upon the rate of change of airspeed $u$ and thus, as long as the airspeed remains constant, the demand is simply that required, as far as pitch is concerned, to correct for deviations of the aircraft from a flight path defined by the exponential function of height $h$. If, however, there is change in airspeed $u$ of the aircraft owing, for example, to change of wind, the second component of the demand is effective to provide added correction of deviation.

A change in airspeed of the aircraft results in change in lift, with the result that there tends to be a consequent deviation from the desired flight path. Such deviation would tend to be corrected in the long term by the action of the first component with reference to height $h$, but the second component tends to provide additional and more rapid corrective action by calling for change in pitch directly in response to change in airspeed $u$. The sense of the change in pitch called for its such as to compensate for the change in lift by causing change in incidence of the aircraft. Thus, if the airspeed decrease, compensation for the consequent decrease in lift is made by operation of the elevators in a sense to increase incidence.

There have been proposals for maintaining airspeed which involve controlling the elevators of an aircraft such that, when there is a decrease in airspeed, incidence is decreased and the airspeed is restored with the consequent loss of height. This of course involves operation of the elevators in the opposite sense from that called for by the present invention. The earlier proposals give a regime which is relatively stable in the long term, but may involve substantial excursions in height. The present invention aims at the reduction of excursions in height (this being of particular importance in the flare phase), the reduced stability being either of limited importance in the short term (as in the flare phase), or counteracted by control of the throttles, in accordance with deviations of airspeed, in such a sense as to maintain airspeed. Although control of the throttles, by manual or automatic means, in accordance with airspeed deviation may be of importance to ensure the optimum functioning of a system in accordance with the present invention, systems for giving such control are already known and do not require description here.

The measurement of airspeed provided by the air data computer 20 may, in certain circumstances, be found to be unreliable owing to ground effects affecting the measurement of the static pressure S. In these circumstances, airspeed *u* may be computed as a function of P alone. The airspeed signal in this latter case will include a component dependent on height, but allowance can readily be made for this since the basic control is carried out in dependence upon a function of height *h*.

It may be arranged that the pitch rate demand $(D\theta)_d$ includes more than just the two components referred to above. In this connection, for example, the demand may in certain circumstances advantageously include a further component which provides a demand for a predetermined variation of pitch attitude with time.

The system described above is one in which control is achieved by providing a demand for rate of movement of the relevant control surfaces, but nevertheless it will be appreciated that the invention is readily applicable to systems in which the demand is for specific position of the control surfaces.

We claim:

1. An automatic flight control system for an aircraft, comprising first means for providing a first signal that varies according to variation of height of the aircraft; second means for providing a second signal that varies according to variation of airspeed of the aircraft; third means for differentiating said second signal with respect to time to derive a third signal dependent upon the rate of change of said aircraft airspeed; and fourth means for providing a demand for manoeuvre of the aircraft in pitch, said fourth means comprising means responsive to said first signal for providing in said demand a first component that is dependent upon a predetermined function of said height, and means responsive to said third signal for providing in said demand a second component that is dependent upon said rate of change of airspeed in a sense tending to compensate for change in airspeed by change in the opposite sense of pitch attitude.

2. An automatic flight control system according to claim 1 for use during a landing manoeuvre, said function of height being a substantially exponential function of height.

3. An automatic flight control system according to claim 1 wherein said first means includes a radio altimeter for providing an electric signal dependent upon the height of the aircraft.

4. An automatic flight control system according to claim 1 wherein said second means includes means responsive to a measure of pitot air pressure for providing an electric signal dependent upon airspeed of the aircraft.

5. An automatic flight control system for controlling an aircraft in pitch during flare-out of a landing manoeuvre, comprising means for providing a first signal that varies according to variation of height of the aircraft; means for providing a second signal that varies according to the rate of change of airspeed of said aircraft; means responsive to said first signal for providing a third signal which varies in accordance with a predetermined flare-out control function dependent upon height; means responsive to said second and third signals to derive a pitch demand signal having a first component dependent upon said third signal and a second component dependent upon said second signal; and servo means for controlling at least one elevator control surface of said aircraft in accordance with said pitch demand signal.

6. In an aircraft having an aerodynamic control surface which is selectively driveable in either of first or second senses to increase or decrease respectively the pitch attitude of said aircraft, an automatic flight control system comprising means for providing a signal which varies in accordance with variations in the vertical position of said aircraft, means responsive to said signal for deriving a primary pitch-control signal component which varies in accordance with deviations from zero of a predetermined flight-path control function which is dependent upon said aircraft vertical position, an airspeed sensor for sensing the airspeed of said aircraft, means coupled to said airspeed sensor for deriving a secondary pitch-control signal component which is dependent in sense upon the sense of any change in said airspeed, said secondary pitch-control signal component being of one of two senses in response to a decrease in the sensed airspeed and being of the other of said two senses in response to an increase in the sensed airspeed, and a pitch-control channel responsive to said primary pitch-control signal component and coupled to said aerodynamic control surface for applying drive to said control surface to reduce said primary signal component to zero, said pitch control channel including means responsive to said secondary pitch-control signal component for increasing said drive in said first sense when said secondary signal component is of said one sense and for increasing said drive in said second sense when said secondary signal component is of said other sense.

7. An automatic flight control system according to claim 6 wherein said means for providing said signal comprises a radio altimeter.

8. An automatic flight control system for use during flare-out of a landing manoeuvre of an aircraft, comprising: first means for providing a first signal which varies in accordance with variations in height of said aircraft; second means for providing a second signal which varies in accordance with variations in airspeed of said aircraft; third means for providing a third signal representative of a demanded rate of change of pitch attitude of said aircraft, said third means comprising means responsive to said first signal for including in said third signal a first component varying in accordance with a predetermined flare-out control function dependent upon the height of said aircraft, and means responsive to said second signal for including in said third signal a second component varying in accordance with the rate of change of airspeed of said aircraft, said second component being of a sense calling for an increase in the demanded pitch rate upon decrease in said airspeed; fourth means responsive to manoeuvre of said aircraft in pitch to provide a fourth signal dependent upon actual rate of change of pitch attitude of said aircraft; and control means responsive to said third and fourth signals for actuating an elevator control surface of said aircraft at a rate dependent upon the difference between said actual and demanded rates of change of pitch attitude.

References Cited by the Examiner

UNITED STATES PATENTS

| | | | |
|---|---|---|---|
| 2,830,291 | 4/1958 | Hecht et al. | 244—77 |
| 3,077,557 | 2/1963 | Joline et al. | 244—77 |
| 3,147,424 | 9/1964 | Miller | 244—77 |
| 3,169,730 | 2/1965 | Gaylor et al. | 244—77 |

FERGUS S. MIDDLETON, *Primary Examiner.*